(12) United States Patent
Tehan et al.

(10) Patent No.: US 7,970,532 B2
(45) Date of Patent: Jun. 28, 2011

(54) FLIGHT PATH PLANNING TO REDUCE DETECTION OF AN UNMANNED AERIAL VEHICLE

(75) Inventors: Matthew Tehan, Albuquerque, NM (US); David Hursig, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 534 days.

(21) Appl. No.: 11/753,017

(22) Filed: May 24, 2007

(65) Prior Publication Data

US 2010/0017114 A1    Jan. 21, 2010

(51) Int. Cl.
G01C 21/00    (2006.01)

(52) U.S. Cl. ............... 701/202; 701/3; 701/23; 701/24; 701/206; 701/209

(58) Field of Classification Search ............... 701/1, 2, 701/3, 10, 13, 200–213, 23, 24; 340/974, 340/979; 244/45 R, 75 R
See application file for complete search history.

(56) References Cited

U.S. PATENT DOCUMENTS

| | | |
|---|---|---|
| 3,992,707 A | 11/1976 | Schmidtlein et al. |
| 4,664,340 A | 5/1987 | Jackson |
| 5,575,438 A | 11/1996 | McGonigle et al. |
| 5,904,724 A | 5/1999 | Margolin |
| 6,377,875 B1 | 4/2002 | Schwaerzler |
| 6,422,508 B1 | 7/2002 | Barnes |
| 6,502,787 B1 | 1/2003 | Barrett |
| 6,575,402 B1 | 6/2003 | Scott |
| 6,588,701 B2 | 7/2003 | Yavnai |
| 6,622,090 B2 | 9/2003 | Lin |
| 6,665,594 B1 | 12/2003 | Armstrong |
| 6,694,228 B2 | 2/2004 | Rios |
| 6,712,312 B1 | 3/2004 | Kucik |
| 6,813,559 B1 | 11/2004 | Bodin et al. |
| 6,847,865 B2 | 1/2005 | Carroll |
| 6,856,894 B1 * | 2/2005 | Bodin et al. ............... 701/206 |
| 6,873,886 B1 | 3/2005 | Mullen et al. |
| 6,925,382 B2 | 8/2005 | Lahn |
| 7,000,883 B2 | 2/2006 | Mercadal et al. |
| 7,107,148 B1 | 9/2006 | Bodin et al. |
| 7,130,741 B2 | 10/2006 | Bodin et al. |
| 7,149,611 B2 | 12/2006 | Beck et al. |
| 7,158,877 B2 | 1/2007 | Carlsson et al. |
| 7,228,227 B2 | 6/2007 | Speer |

(Continued)

FOREIGN PATENT DOCUMENTS

EP    1868008    12/2007

(Continued)

*Primary Examiner* — Richard M. Camby
(74) *Attorney, Agent, or Firm* — Ingrassia Fisher & Lorenze, P.C.

(57) ABSTRACT

Methods and systems for planning, managing, and executing the flight path of an unmanned aerial vehicle are disclosed. In particular, the methods and systems are designed to reduce the likelihood that the UAV will be detected by determining a flight path based on the proximity of the UAV to a point of interest and the visual, acoustic, and infrared signatures of the UAV relative to a point of interest. Additionally, the methods and systems enable a UAV operator to compare a recommend flight path and an altered flight path based on how the altered flight path changes the proximity of the UAV to a point of interest, and changes the visual, acoustic, and infrared signatures of the UAV relative to a point of interest.

20 Claims, 13 Drawing Sheets

U.S. PATENT DOCUMENTS

| | | |
|---|---|---|
| 7,231,294 B2 | 6/2007 | Bodin et al. |
| 7,269,513 B2 | 9/2007 | Herwitz |
| 7,286,913 B2 | 10/2007 | Bodin et al. |
| 7,289,906 B2 | 10/2007 | van der Merwe et al. |
| 7,299,130 B2 | 11/2007 | Mulligan et al. |
| 7,302,316 B2 | 11/2007 | Beard et al. |
| 7,343,232 B2 | 3/2008 | Duggan et al. |
| 2005/0165517 A1 | 7/2005 | Reich |
| 2006/0097107 A1 | 5/2006 | Parks et al. |
| 2006/0102780 A1 | 5/2006 | Parks |
| 2006/0106506 A1 | 5/2006 | Nichols et al. |
| 2006/0121418 A1 | 6/2006 | DeMarco et al. |
| 2006/0192047 A1 | 8/2006 | Goossen |
| 2006/0197835 A1 | 9/2006 | Anderson et al. |
| 2006/0235584 A1 | 10/2006 | Fregene et al. |
| 2006/0253228 A1 | 11/2006 | Abraham et al. |
| 2006/0271248 A1 | 11/2006 | Cosgrove et al. |
| 2006/0287824 A1 | 12/2006 | Lin |
| 2007/0018052 A1 | 1/2007 | Eriksson |
| 2007/0069083 A1 | 3/2007 | Shams et al. |
| 2007/0093945 A1 | 4/2007 | Grzywna et al. |
| 2007/0129855 A1 | 6/2007 | Coulmeau |
| 2007/0131822 A1 | 6/2007 | Stallard |
| 2007/0200027 A1 | 8/2007 | Johnson |
| 2007/0221790 A1 | 9/2007 | Goossen |
| 2007/0244608 A1 | 10/2007 | Rath et al. |
| 2007/0246610 A1 | 10/2007 | Rath et al. |
| 2007/0271032 A1 | 11/2007 | Cheng et al. |
| 2007/0284474 A1 | 12/2007 | Olson et al. |
| 2008/0023587 A1 | 1/2008 | Head et al. |
| 2008/0033604 A1 | 2/2008 | Margolin |
| 2008/0035786 A1 | 2/2008 | Bilyk et al. |
| 2008/0059068 A1 | 3/2008 | Strelow et al. |
| 2008/0071431 A1 | 3/2008 | Dockter et al. |
| 2008/0078865 A1 | 4/2008 | Burne |

FOREIGN PATENT DOCUMENTS

| | | |
|---|---|---|
| GB | 2394340 | 4/2004 |
| WO | 2007001369 | 1/2007 |
| WO | 2007058643 | 5/2007 |

* cited by examiner

FLIGHT PATH PLANNING TO REDUCE DETECTION OF AN UNMANNED AERIAL VEHICLE

GOVERNMENT RIGHTS

The United States Government may have acquired certain rights in this invention pursuant to Contract No. HR0011-05-C-0043 with the Defense Advanced Research Project Agency

FIELD OF THE INVENTION

The present invention relates to planning, managing, and executing the flight path of an unmanned aerial vehicle to reduce the likelihood of detection.

BACKGROUND

Unmanned Air Vehicles (UAVs) are used for a variety of missions such as reconnaissance, surveillance and target acquisition (RSTA). Typically a UAV executes a mission by flying from a starting point to one or more points of interest along a predefined route before arriving at the ending point. An operator may load the starting point, points of interest, and ending point into the UAV as a mission flight plan that the operator develops using a flight planner or ground control station with a graphical user interface. Once launched, the UAV can execute the mission flight plan autonomously or with varying degrees of remote operator guidance.

In general, the operator plans the flight path of the UAV based on his or her own experience and intuition. Prior ground control stations can display a UAV mission flight plan superimposed over a map or photographic image showing the location of points of interest. Prior ground control stations can also check the flight path for terrain conflicts and determine whether the flight path exceeds fuel and battery limits, high and low altitude limits, or other performance limits. However, existing ground control stations do not help operators plan low-altitude UAV missions to minimize the likelihood of detection and thus maximize the survivability of the UAV.

Many UAVs, especially fixed wing UAVs, operate at high altitudes where detection by observers is difficult. However, vertical take-off and landing (VTOL) UAVs are often designed to operate close to the ground and may remain stationary in the air to provide a stable platform to observe a target, determine a precise target location, and/or designate a target. When performing RSTA missions, UAVs in general, and VTOL UAVs in particular, may become targets for destruction or disablement by hostile forces wishing to remain unseen.

SUMMARY OF THE INVENTION

Methods and systems for planning and executing the flight path of a UAV to reduce detection are disclosed. In particular, the methods and systems are designed to reduce the probability of UAV detection and thereby increase UAV survivability during flight by determining a recommended flight path that: (1) avoids a point of interest; (2) reduces the UAV's visual signature relative to a point of interest; (3) reduces the UAV's acoustic signature relative to a point of interest; and/or (4) reduces the UAV's infrared signature relative to a point of interest. The methods and systems also allow an operator to alter the recommended flight path and provide the operator with a comparison of the recommend flight path and the altered flight path based on how the altered flight path changes: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest. In the following summary, numerous specific details are set forth to provide a thorough understanding of the invention; however, the invention may be practiced without these specific details. Additionally, well known circuits, structures, standards, and techniques have not been described in detail in order to not obscure the invention.

One illustrative method of planning a flight path of a UAV according to the present invention comprises: (1) determining a recommended flight path based on a plurality of data inputs including flight path requirements comprising a start point and an end point, terrain data from a terrain elevation database, and inputs from a map, aeronautical chart, and/or an aerial photograph; and (2) displaying a graphical representation of the recommended flight path based on the plurality of data inputs.

In one embodiment, the plurality of data inputs include one or more inputs from a group of databases such as: (1) a threat database; (2) a map database; (3) an acoustic signature database; (4) a flora database; (5) a weather database; (6) an aerial photographic information database; and/or (7) an aeronautical chart database.

In one embodiment, the flight path requirements comprise a start point and an end point. The start point is the location where the UAV mission will start and the end point is the location where the UAV mission will end. The flight path requirements may also include one or more points of interest. Points of interest may include locations, geographical features, areas, targets, buildings, bridges, roads, vehicles, people, or groups of people. The UAV may monitor selected points of interest with cameras, microphones, or other similar sensor devices while executing its flight path. Points of interest may also include targets that the UAV will indicate or mark with lasers, beacons, signals, or other similar targeting mechanisms while executing its flight path.

Points of interest may also include threats to the UAV. Threats to the UAV include any actual or suspected threats to the UAV's safety, including any people, sensors, or other devices designed to visually detect the UAV, audibly detect the UAV, sense the UAV through other sensor devices such as an infrared sensor, disable the UAV, or destroy the UAV. Information about threats to the UAV is preferably contained within a threat database. However, in an alternative embodiment, threat data not included in a threat database may be contained in other databases, may be manually entered by an operator, or may be downloaded from a source such as a mission command center.

In one embodiment, the flight path requirements are entered by a UAV operator. In an alternative embodiment, the flight path requirements may be received and/or downloaded directly from a source, such as from a mission command center.

In one embodiment of the present invention, the flight path determined and displayed by the method corresponds to a planned flight path, i.e., a flight path to be taken in the future. In an alternative embodiment, the flight path determined and displayed by the method may correspond to a real-time flight path, i.e., the actual flight path being executed in real-time by the UAV on its mission. In yet another embodiment, the flight path may correspond to a planned flight path and a real-time flight path, with an operator monitoring the progress of the UAV along the planned flight path and making adjustments to the planned flight path in real-time.

BRIEF DESCRIPTION OF THE DRAWINGS

Embodiments of the present invention are described herein with reference to the drawings in which.

DETAILED DESCRIPTION OF THE DRAWINGS

Figure 1A:
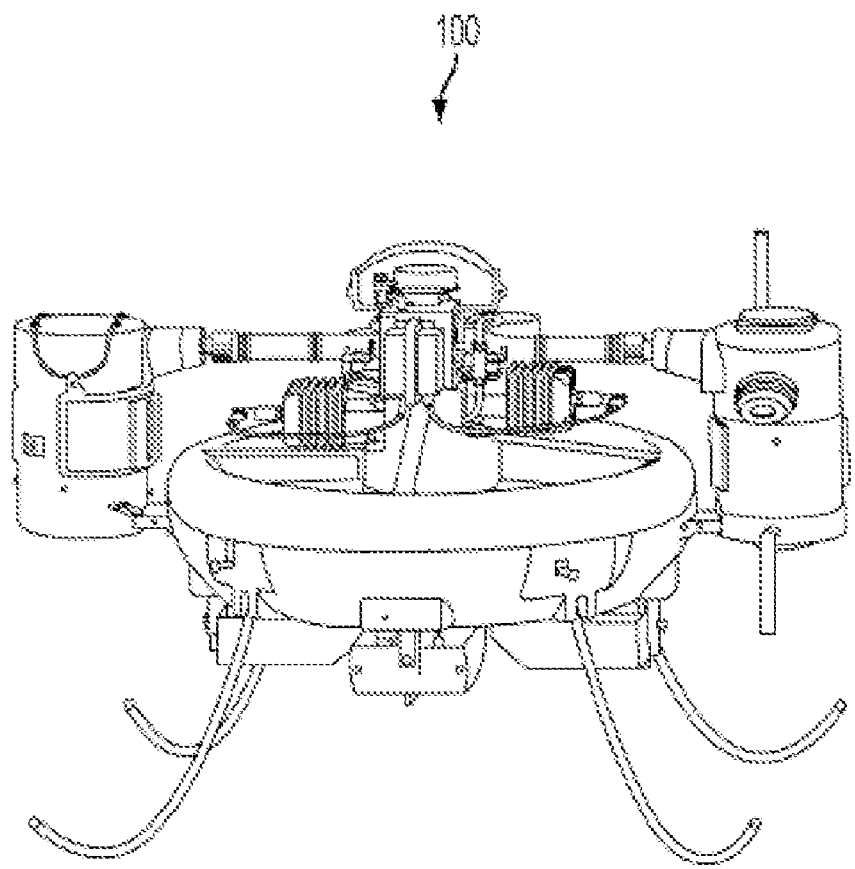
FIG. 1A is an illustration of a VTOL UAV and a UAV ground control station used to control the UAV.
Figure 1A:
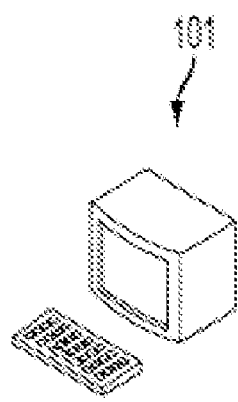
Figure 1B:
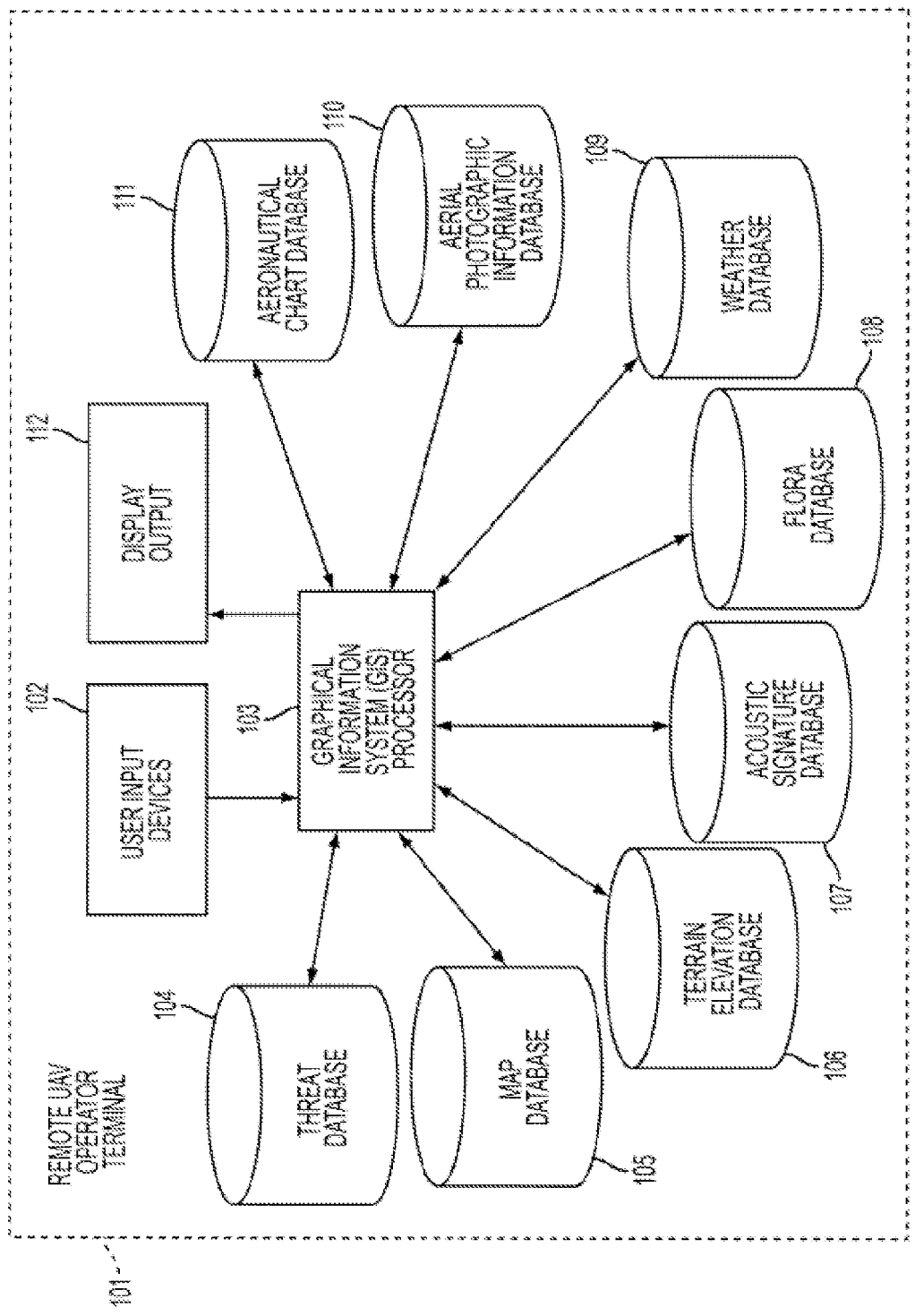
FIG. 1B illustrates one embodiment of the present invention showing a Graphical Information System Processor and a plurality of Information Databases providing information to the Graphical Information System Processor.

FIGS. 1A and 1B show an example of a system for determining a flight path for a typical VTOL UAV 100. UAV 100 is generally used for RTSA missions. For example, UAV 100 launches and executes an RSTA mission by flying to one or more waypoints along a flight path before arriving at the landing position. Once launched, UAV 100 can execute the mission flight path along the flight path autonomously or with varying degrees of remote operator guidance from UAV ground control station 101.

FIG. 1B shows one illustrative embodiment of the present invention. UAV ground control station 101 may include: (1) at least one user input device 102, which may include one or more keyboards, joystick controllers, touch-screens, mouse/pointer devices, disk drives, serial and/or parallel data bus interfaces, and/or other similar input devices; (2) a Graphical Information System (GIS) Processor 103 for processing and generating graphical data; (3) one or more information databases 104-111; and (4) a display output 112 for displaying information to the UAV operator, which may include one or more computer terminal screens, video screens, or other similar display devices. The one or more information databases in the illustrative embodiment shown in FIG. 1B include a Threat Database 104, a Map Database 105, a Terrain Elevation Database 106, an Acoustic Signature Database 107, a Flora Database 108, a Weather Database 109, an Aerial Photographic Information Database 110, and an Aeronautical Chart Database 111. These databases may be separate or combined into one or more larger databases.

The GIS Processor 103 uses flight path requirements and information from the databases 104-111 to determine a flight path that: (1) arrives at or avoids a point of interest; (2) reduces the UAV's visual signature relative to a point of interest; (3) reduces the UAV's acoustic signature relative to a point of interest; and/or (4) reduces the UAV's infrared signature relative to a point of interest.

Threat Database 104 preferably contains information on any actual or suspected threats to the safety of UAV 100, including any people, sensors, or other devices designed to visually or audibly detect UAV 100, detect the infrared signature of UAV 100, disable UAV 100, or destroy UAV 100. Information contained within Threat Database 104 may come from a variety of reconnaissance sources such as satellite photos, aerial photos, ground observation, data from earlier UAV missions, or other intelligence sources. GIS Processor 103 may use data in Threat Database 104 to determine the flight path of UAV 100, which may include determining a flight path for UAV 100 that: (1) avoids a threat; (2) reduces the visual signature of UAV 100 relative to a threat; (3) reduces the acoustic signature of UAV 100 relative to a threat; and/or (4) reduces the infrared signature of UAV 100 relative to a threat. GIS Processor 103 may also display a graphical representation of data from Threat Database 104 along the flight path for UAV 100 along with other information from the one or more databases 104-111 on display output 112.

Map Database 105 contains map data for the area surrounding the UAV flight path, and may include the location of terrain features, streets, roads, highways, railroad tracks, bridges, airports, towns, cities, rivers, streams, lakes, ponds, coastlines, buildings, or any other data that might be displayed on a map. GIS Processor 103 uses flight path requirements and data in Map Database 105 to determine the flight path of UAV 100, which may include determining a flight path for UAV 100 based on: (1) arriving at or avoiding a point of interest, including a threat to the UAV; (2) the visual signature of UAV 100 relative to a point of interest, including a threat to UAV 100; (3) the acoustic signature of UAV 100 relative to a point of interest, including a threat; and/or (4) the infrared signature of UAV 100 relative to a point of interest, including a threat. GIS Processor 103 may also use data from Map Database 105 to display a graphical representation of the flight path for UAV 100 and information from the one or more databases 104-111 on display output 112. For example, GIS Processor 103 might use data from Map Database 105 as a background over which to overlay other relevant data such as the flight path for UAV 100, points of interest (including threats to UAV 100), flora information along the flight path, elevation information along the flight path, acoustic signature information, and the like.

Terrain Elevation Database 106 contains information on the elevation of the terrain in the area along the flight path of the UAV 100. GIS Processor 103 uses flight path requirements and data in Terrain Elevation Database 106 to determine the flight path of UAV 100 based on: (1) a point of interest, including a threat to the UAV; (2) the visual signature of UAV 100 relative to a point of interest, including a threat to UAV 100; (3) the acoustic signature of UAV 100 relative to a point of interest, including a threat; and/or (4) the infrared signature of UAV 100 relative to a point of interest, including a threat. For example, GIS Processor 103 might use data in Terrain Elevation Database 106 to display the elevation of the terrain along the flight path and to determine: (1) that UAV 100 should fly over a ridge line at a low point rather than flying over the ridge line at a high point; (2) that UAV 100 should fly in a canyon to avoid detection by a threat; or (3) that UAV 100 should hover in front of the terrain rather than hover in a position silhouetted against the sky. GIS Processor 103 may also use data from Terrain Elevation Database 106 to display a graphical representation of the flight path for UAV 100 and information from the one or more databases 104-111 on display output 112.

Acoustic Signature Database 107 contains estimates of the noise generated by the UAV. The data within Acoustic Signature Database 107 may be calculated relative to a point of interest, including the location of actual or suspected threats. The data within Acoustic Signature Database 107 may be calculated from models of the aerodynamic noise and engine noise as a function of the UAV azimuth and polar angle relative to an actual or suspected listener located at a point of interest. Alternatively, the data within Acoustic Signature Database 107 may contain general engine and/or aerodynamic noise figures for the UAV 100 from which an acoustic signature relative to a point of interest may be calculated. GIS Processor 103 uses flight path requirements and data in Acoustic Signature Database 107 to determine the flight path of UAV 100 based on the acoustic signature of UAV 100 relative to a point of interest, including a threat. GIS Processor 103 may also use data from Acoustic Signature Database 107 to display a graphical representation of the flight path for UAV 100 and information from the one or more databases 104-111 on display output 112.

Flora Database 108 contains information on the plant life in the area along the flight path, such as the presence and color of tree lines, grassy areas, brush, and other ground foliage. The data within Flora Database 108 may come from a variety of reconnaissance sources such as satellite photos, aerial photos, ground observation, data from earlier UAV missions, or other intelligence sources. GIS Processor 103 uses flight path requirements and data in Flora Database 108 to determine the flight path of UAV 100 based on whether UAV 100 can take advantage of flora to aid in concealment, which may include: (1) determining a flight path for UAV 100 that avoids a point of interest, including a possible threat to the UAV; (2) determining a flight path for UAV 100 based on the visual signature of UAV 100 relative to a point of interest; and/or (3) determining a flight path for UAV 100 based on the acoustic signature of UAV 100 relative to a point of interest. For example, GIS Processor 103 might use data contained in Flora Database 108 to: (1) determine that UAV 100 should fly along a tree line or hover in front of a hill containing grass or brush having a color similar to the paint on the exterior of UAV 100 to reduce the visual signature of UAV 100 relative to a point of interest, including a threat to UAV 100; or (2) determine that UAV 100 should fly behind a tree line to reduce the acoustic signature of UAV 100 relative to a point of interest, including a threat to UAV 100. GIS Processor 103 may also use data from Flora Database 108 to display a graphical representation of the flight path for UAV 100 and information from the one or more databases 104-111 on display output 112.

Weather Database 109 contains information on current and forecasted weather conditions in the area along the flight path, such as the presence and direction of sunlight, the absence of sunlight, the presence or absence of precipitation or humidity, the temperature, and the like. GIS Processor 103 uses flight path requirements and data in Weather Database 109 to determine the flight path of UAV 100 based on whether UAV 100 can take advantage of weather conditions to avoid detection, such as determining a flight path for UAV 100 based on: (1) a point of interest, including a threat to the UAV; (2) the visual signature of UAV 100 relative to a point of interest, including a threat to UAV 100; (3) the acoustic signature of UAV 100 relative to a point of interest, including a threat; and/or (4) the infrared signature of UAV 100 relative to a point of interest, including a threat. For example, GIS Processor 103 might: (1) determine that UAV 100 should hover in the shadow of the terrain; (2) determine that UAV 100 is able to fly closer to a point of interest without being detected because rain and clouds in the area would make UAV 100 more difficult to hear and/or see; and/or (3) determine that UAV 100 should fly farther away from a point of interest because the weather is sunny and cold thus enabling UAV 100 to be seen and/or heard from farther away. GIS Processor 103 may also use data from Weather Database 109 to display a graphical representation of the flight path for UAV 100 and information from one or more databases 104-111 on display output 112.

Aerial Photographic Information Database 110 contains aerial photographic information that can be laid over data of the other databases to verify the data contained in the other databases, e.g., the flora, terrain, location of roads, bridges, buildings, and the like or to identify points of interest for the UAV to monitor. GIS Processor 103 uses flight path requirements and data in Aerial Photographic Information Database 110 to determine the flight path of UAV 100, which may include determining a flight path for UAV 100 based on: (1) a point of interest, including a threat to the UAV; (2) the visual signature of UAV 100 relative to a point of interest, including a threat to UAV 100; (3) the acoustic signature of UAV 100 relative to a point of interest, including a threat; and/or (4) the infrared signature of UAV 100 relative to a point of interest, including a threat. GIS Processor 103 may also use data from Aerial Photographic Information Database 110 to display a graphical representation of the flight path for UAV 100 and information from the one or more databases 104-111 on display output 112.

Aeronautical Chart Database 111 contains aeronautical chart information that can be used in combination with data from the other databases. GIS Processor 103 may use data in Aeronautical Chart Database 111 to determine the flight path of UAV 100, which may include determining a flight path for UAV 100 based on: (1) a point of interest, including a threat to the UAV; (2) the visual signature of UAV 100 relative to a point of interest, including a threat to UAV 100; (3) the acoustic signature of UAV 100 relative to a point of interest, including a threat; and/or (4) the infrared signature of UAV 100 relative to a point of interest, including a threat. GIS Processor 103 may also use data from Aeronautical Chart Database 111 to display a graphical representation of the flight path for UAV 100 and information from the one or more databases 104-111 on display output 112.

Those skilled in the art will recognize that various embodiments of the present invention will function without the need for all information databases in the illustrative embodiment described above. Likewise, embodiments of the present invention may also make use of additional information databases not shown in the illustrative embodiment depicted in FIG. 1B.

Figure 2:
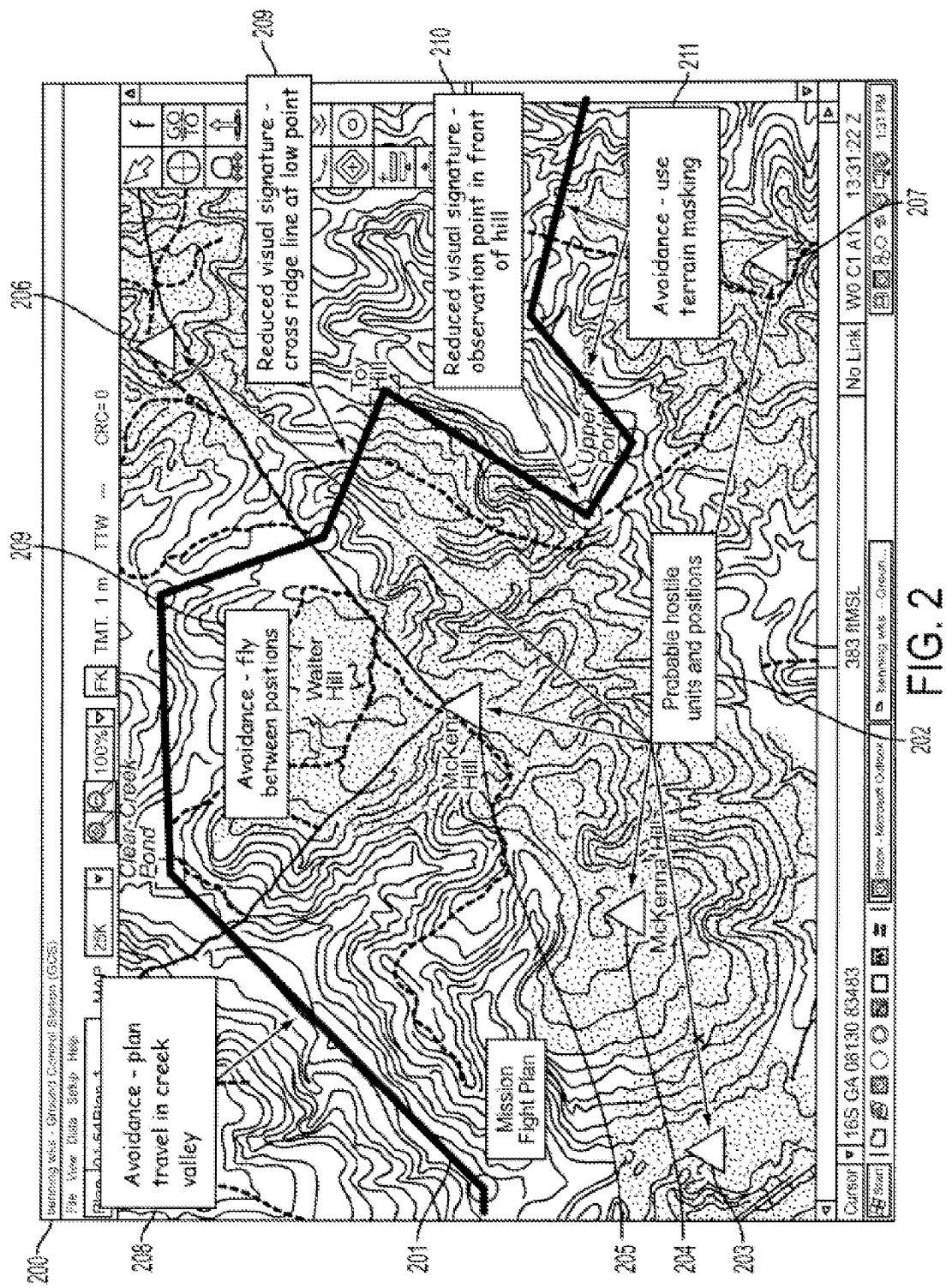
FIG. 2 is an illustration of one embodiment of the present invention showing a flight path for a UAV on a map showing the location points of interest and flight path actions to minimize the likelihood of the UAV being detected by personnel or sensors located at the points of interest.

FIG. 2 shows an illustration of one illustrative example of a graphical user interface (GUI) 200 that might be displayed on display output 112 of UAV ground control station 101. Illustrative GUI 200 shows a graphical representation of the UAV flight path 201, map information from Map Database 105, terrain elevation information from Terrain Elevation Database 106, the locations of actual and suspected threats preferably contained in Threat Database 104, and information about the flora in the area of the flight path from Flora Database 108. In this illustrative embodiment, operator alert 202 calls the UAV operator's attention to the location of actual or suspected threats 203-207 based on information preferably contained in Threat Database 104. Operator alert 208 calls the UAV operator's attention to a flight path determination that the UAV flight path 201 should follow a creek valley to avoid detection by the threats based on elevation information contained in Terrain Elevation Database 106 and threat location information contained in Threat Database 104. Operator alert 209 calls the UAV operator's attention to a flight path determination that the UAV flight path 201 should follow a course between threat 205 and threat 206 to minimize the chance that either threat 205 or threat 206 will detect the UAV based on information in any or all of Threat Database 104, Terrain Elevation Database 106, Acoustic Signature Database 107, Flora Database 108, and Weather Database 109. Operator alert 210 calls the operator's attention to a flight path determination that the UAV flight path 201 should cross the ridge line at a low point to reduce the visual signature of the UAV based on information contained in Threat Database 104 and Terrain Elevation Database 106. Operator alert 211 calls the operator's attention to a flight path determination that the UAV flight path 201 should follow the front side of a hill to reduce the visual signature of the UAV based on information in Threat Database 104 and Terrain Elevation Database 106. Finally, Operator alert 212 calls the operator's attention to a flight path determination that the UAV flight path 201 should take advantage of terrain masking to reduce the visual signature of the UAV and avoid detection by threat 207 based on information in Threat Database 104 and information in Flora Database 108.

Figure 3A:
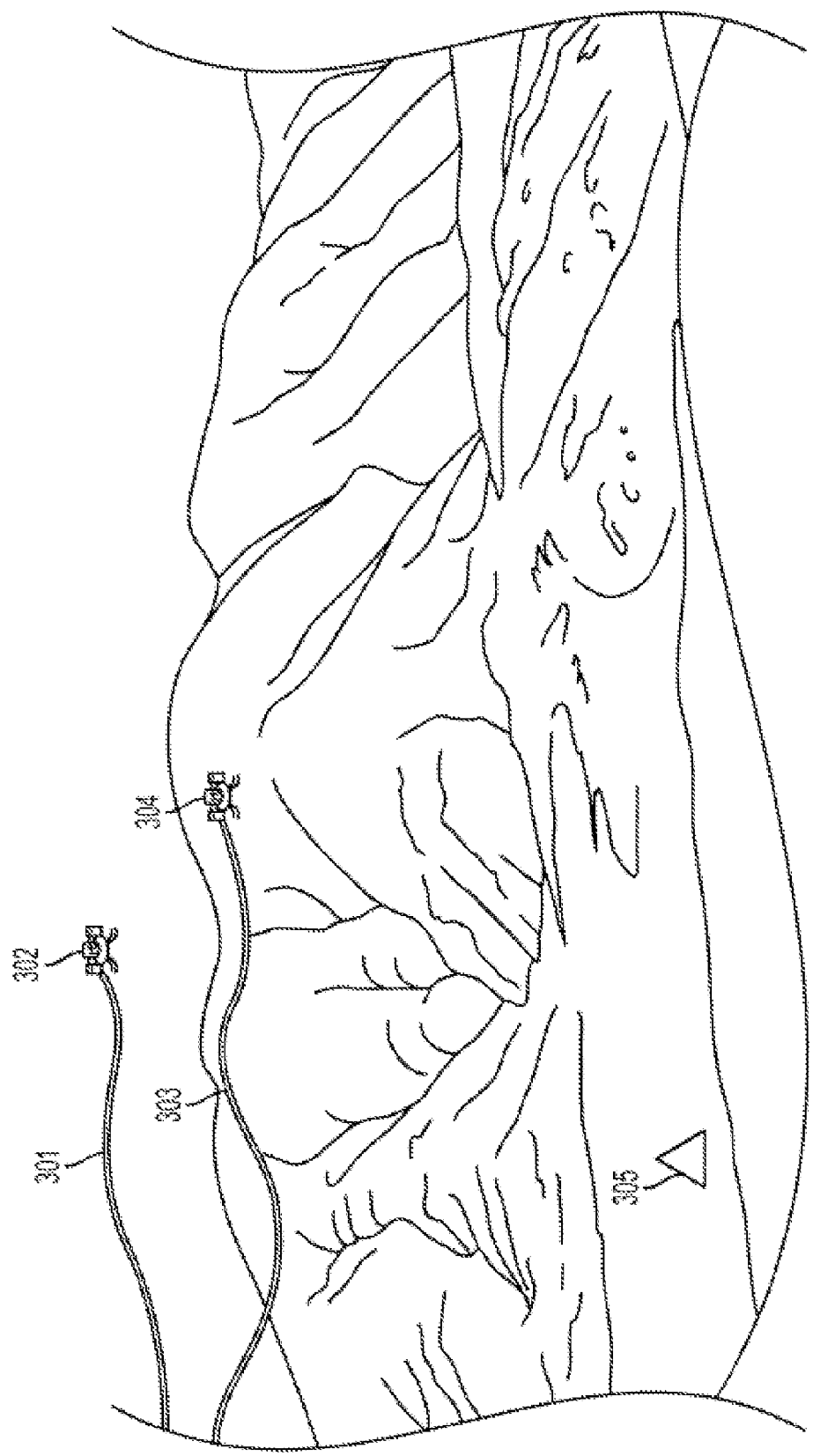
FIGS. 3A, 3B, and 3C show resulting UAV flight paths determined by one embodiment of the present invention to reduce the visual signature of the UAV relative to points of interest.

FIG. 3A shows an illustrative resulting flight path determined by an embodiment of the present invention to reduce the visual signature of the UAV relative to a point of interest, which may be a threat to the UAV. Undesirable flight path 301 positions the UAV at point 302 silhouetted against the sky, thereby making the UAV easily seen by point of interest 305. A better flight path 303 positions the UAV at point 304 silhouetted against the terrain, thereby making the UAV more difficult to detect by point of interest 305. To determine the better flight path 303, referring back to FIG. 1, the GIS Processor 103 might rely on its flight requirements and information contained in Threat Database 104, Map Database 105, and Terrain Elevation Database 106. GIS Processor 103 might also rely on information about the color and type of ground foliage in the area obtained from Flora Database 108 to determine a flight path that camouflages the UAV in front of similarly colored foliage, thereby further reducing the visual signature of the UAV relative to point of interest 305.

Figure 3B:

FIG. 3B shows another illustrative resulting flight path determined by an embodiment of the present invention to reduce the visual signature of the UAV relative to a point of interest. Undesirable flight path 306 positions the UAV at point 307 in front of a sunlit hill relative to point of interest 308, thereby making the UAV easily seen by point of interest 308, which may pose a threat to the UAV. A better flight path 309 positions the UAV at point 310 in front of the shadows of a sunlit hill relative to point of interest 308, thereby making the UAV more difficult for point of interest 308 to detect. To determine the better flight path 309, referring back to FIG. 1, the GIS Processor 103 might rely on its flight requirements and information contained in Threat Database 104, Map Database 105, Terrain Elevation Database 106, and Weather Database 109.

Figure 3C:
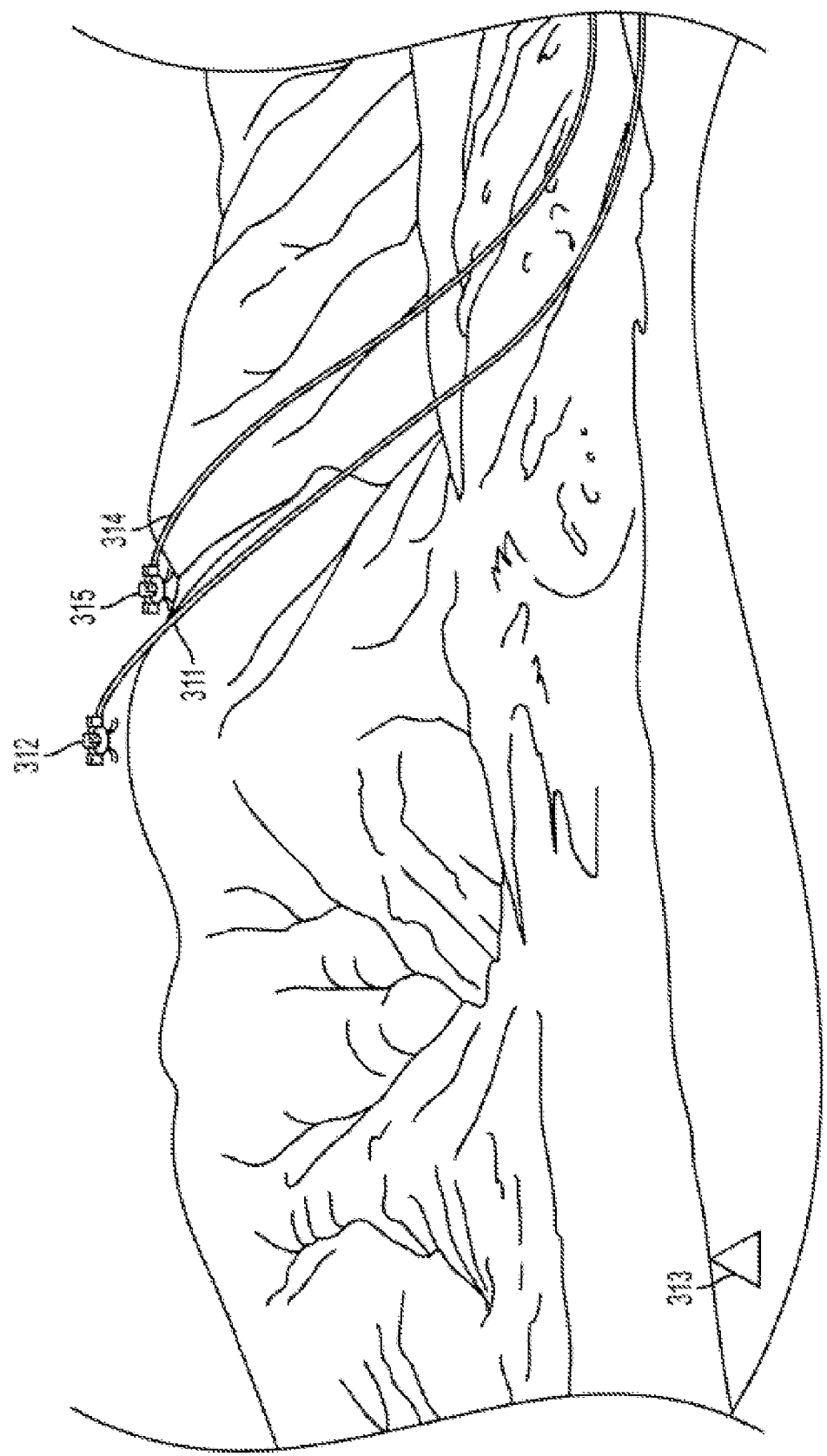

FIG. 3C shows yet another illustrative resulting flight path determined by an embodiment of the present invention to reduce the visual signature of the UAV relative to a point of interest. Undesirable flight path 311 positions the UAV at point 312 crossing a ridge line at a high point, thereby silhouetting the UAV against the sky and causing the UAV to be easily seen by point of interest 313, which may represent a threat to the UAV. A better flight path 314 positions the UAV at point 315 crossing the ridge line at a low point between two peaks, thereby making the UAV more difficult for point of interest 313 to detect. To determine the better flight path 314, referring back to FIG. 1, the GIS Processor 103 might rely on its flight requirements and information contained in Threat Database 104, Map Database 105, and Terrain Elevation Database 106.

Figure 4A:
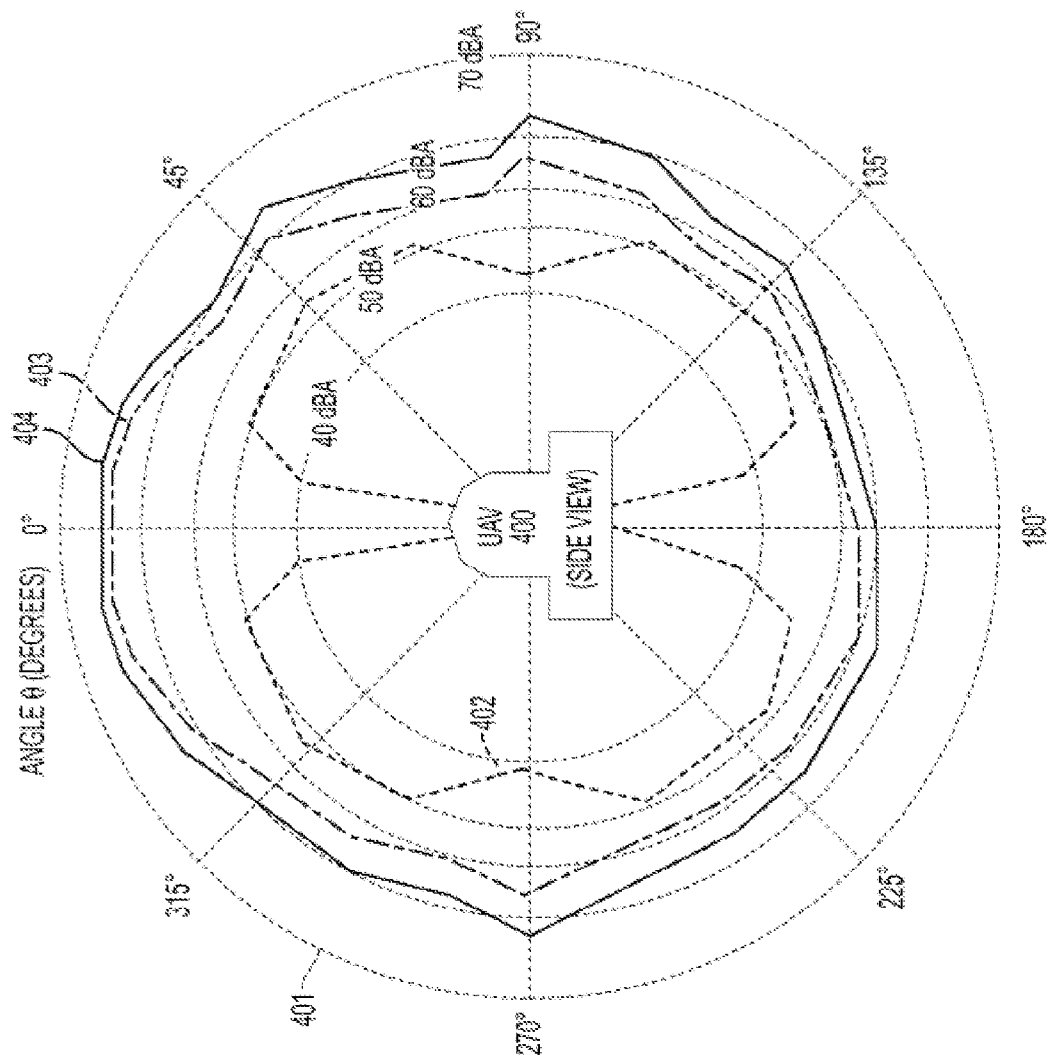
FIGS. 4A and 4B show how the acoustic signature of the UAV changes as a function of polar and azimuth angles.
Figure 4B:
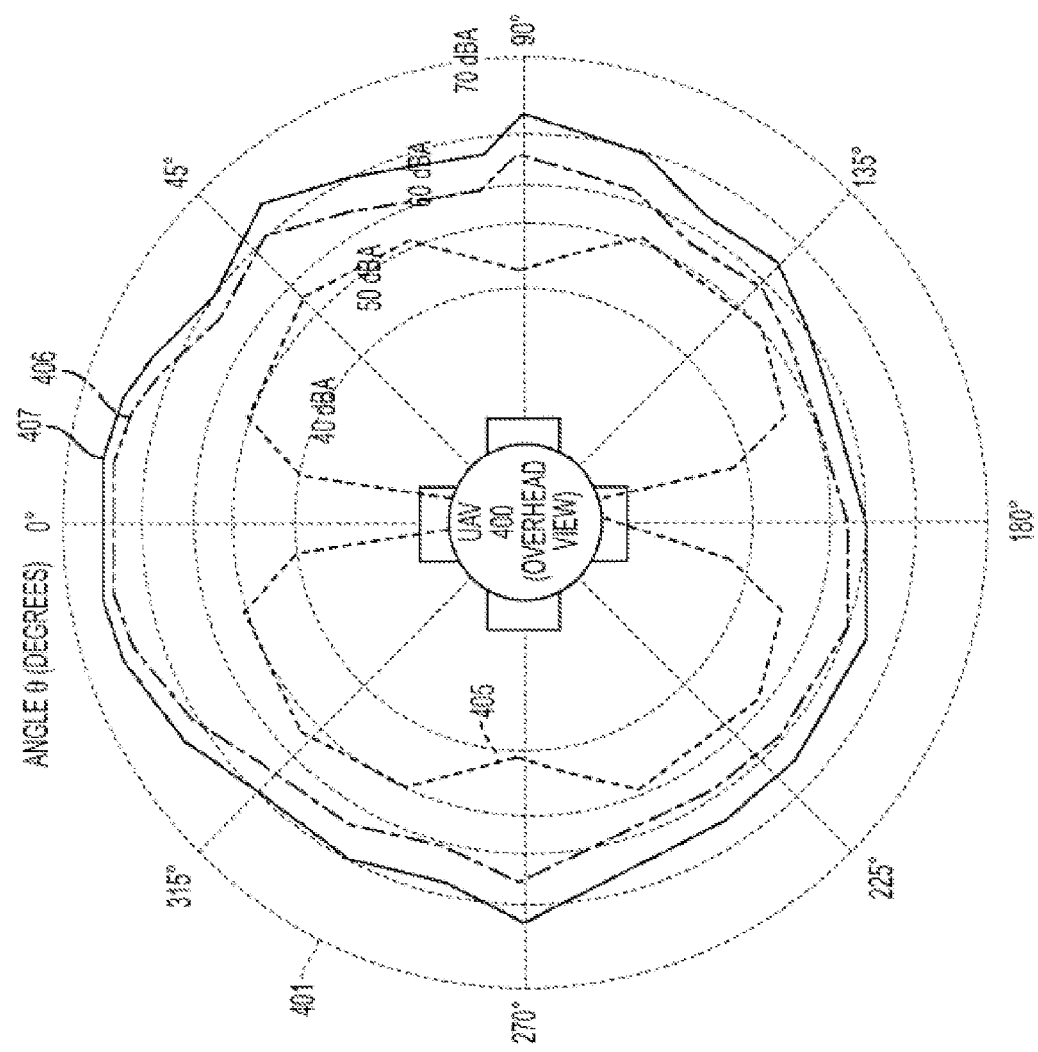

FIGS. 4A and 4B show how the acoustic signature of the UAV changes as a function of polar and azimuth angles.

FIG. 4A shows the total UAV vehicle noise detectable by a listener as a function of azimuth angle relative to the UAV, where the total vehicle noise comprises the UAV aerodynamic noise and the UAV engine noise. UAV 400 radiates aerodynamic noise and engine noise as it flies according to radial chart 401. Each concentric circle on the radial chart 401 marks the level of UAV noise level detectable by a listener as a function of the listener's azimuth angle relative to the UAV. Dashed trace 402 shows the UAV aerodynamic noise level detectable by a listener as a function of the listener's azimuth angle relative to the UAV. Dashed-dotted trace 403 shows the UAV engine noise level detectable by a listener as a function of the listener's azimuth angle relative to the UAV. Solid trace 404 shows the total vehicle noise of UAV 400 detectable by a listener as a function of the listener's azimuth angle relative to the UAV, where the total vehicle noise is the sum of the UAV aerodynamic noise and the UAV engine noise. For example, FIG. 4A shows that the total noise in dBA detectable by a listener as a function of the listener's azimuth angle relative to the UAV varies from approximately 55 dBA to 65 dBA depending on the listener's azimuth angle relative to the UAV.

FIG. 4B shows the total UAV vehicle noise detectable by a listener as a function of polar angle relative to the UAV, where the total vehicle noise comprises the UAV aerodynamic noise and the UAV engine noise. UAV 400 radiates aerodynamic noise and engine noise as it flies according to radial chart 401. Each concentric circle on the radial chart 401 marks the level of UAV noise in adjusted decibels (dBA) detectable by a listener as a function of the listener's polar angle relative to the UAV. Dashed trace 405 shows the UAV aerodynamic noise in dBA detectable by a listener as a function of the listener's polar angle relative to the UAV. Dashed-dotted trace 406 shows the UAV engine noise in dBA detectable by a listener as a function of the listener's polar angle relative to the UAV. Solid trace 407 shows the total vehicle noise of UAV 400 detectable by a listener as a function of the listener's polar angle relative to the UAV, where the total vehicle noise is the sum of the UAV aerodynamic noise and the UAV engine noise. For example, FIG. 4B shows that the total noise in dBA detectable by a listener as a function of the listener's polar angle relative to the UAV varies from approximately 55 dBA to 65 dBA depending on the listener's polar angle relative to the UAV.

Figure 4C:
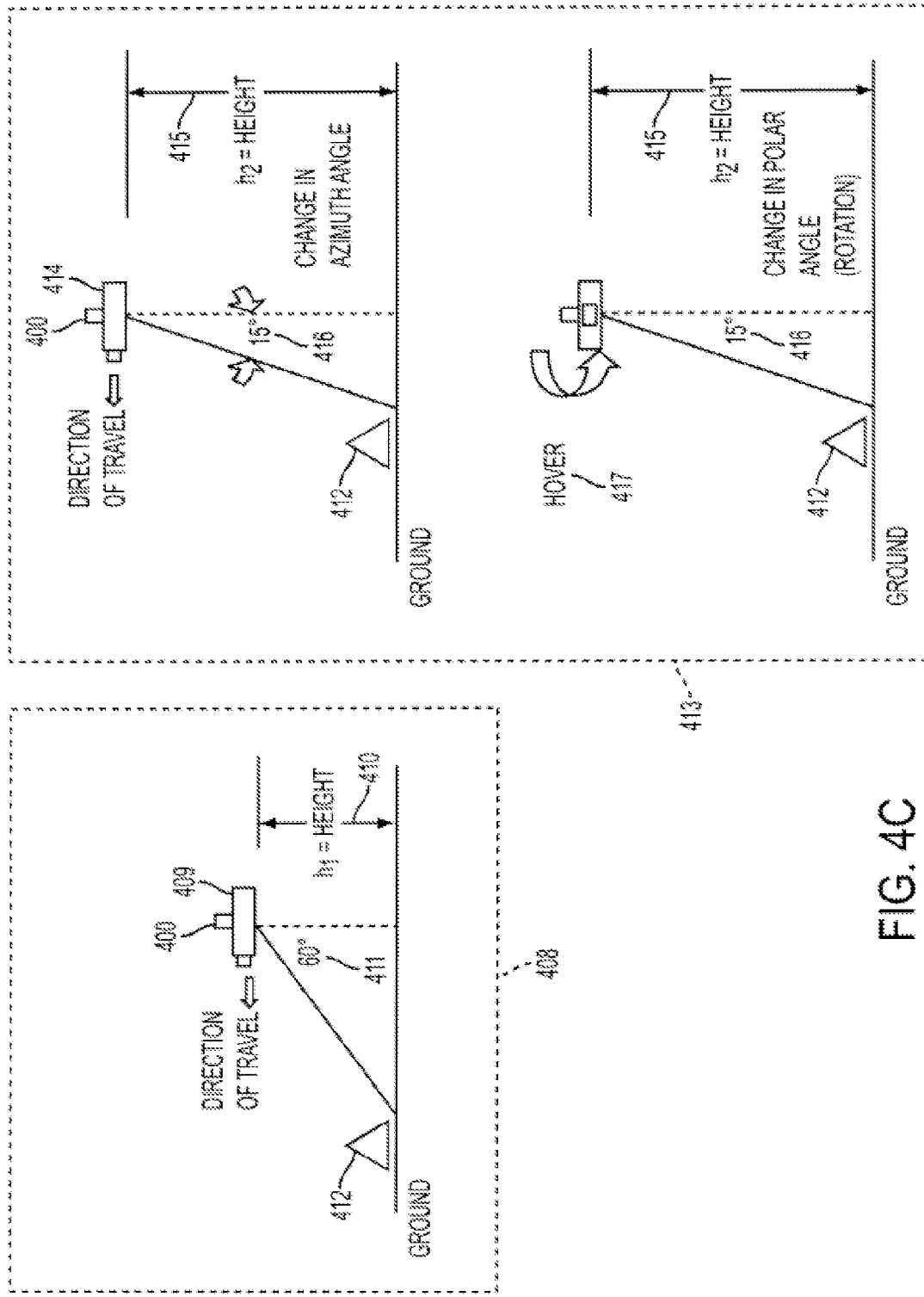
FIG. 4C shows illustrative resulting UAV flight paths determined by one embodiment of the present invention to reduce the acoustic signature of the UAV relative to a point of interest.

FIG. 4C shows a flight path determined by an illustrative embodiment of the present invention to reduce the acoustic signature of UAV 400 relative to a point of interest. The undesirable flight path shown in box 408 positions UAV 400 at point 409 having a first height 410 and azimuth angle 411 of sixty degrees relative to point of interest 412, thereby causing point of interest 412 to hear approximately 58 dBA of noise from UAV 400, based on the total UAV noise detectable by a listener as a function of the listener's azimuth angle relative to the UAV according to the radial chart shown in FIG. 4A. In a military context, point of interest 412 may represent a threat to the UAV, such as a military base, guard, scout or the like. In a civilian context, point of interest 412 may represent a hospital, school, or office building where the UAV operator wishes to minimize noise heard by listeners in the school, hospital, or office building. A better flight path shown in box 413 positions UAV 400 at point 414 having a second height 415 and at an azimuth angle 416 of fifteen degrees relative to point of interest 412, thereby causing point of interest 412 to hear approximately 55 dBA of noise from UAV 400, based on the radial chart shown in FIG. 4A. The better flight path shown in box 413 yields a 3 dB reduction in the acoustic signature of UAV 400 relative to point of interest 412 as compared to the undesirable flight path shown in box 408. The better flight path in box 413 may also be at a different polar position of UAV 400 relative to point of interest 412 caused by a change 417 the rotation of UAV 400, based on the total UAV noise in detectable by a listener as a function of the listener's polar angle relative to the UAV according to the radial chart shown in FIG. 4B. To determine the better flight path of box 413, referring back to FIG. 1, GIS Processor 103 might rely on its flight requirements and information contained in Threat Database 104 and Acoustic Signature Database 107.

Figure 5:
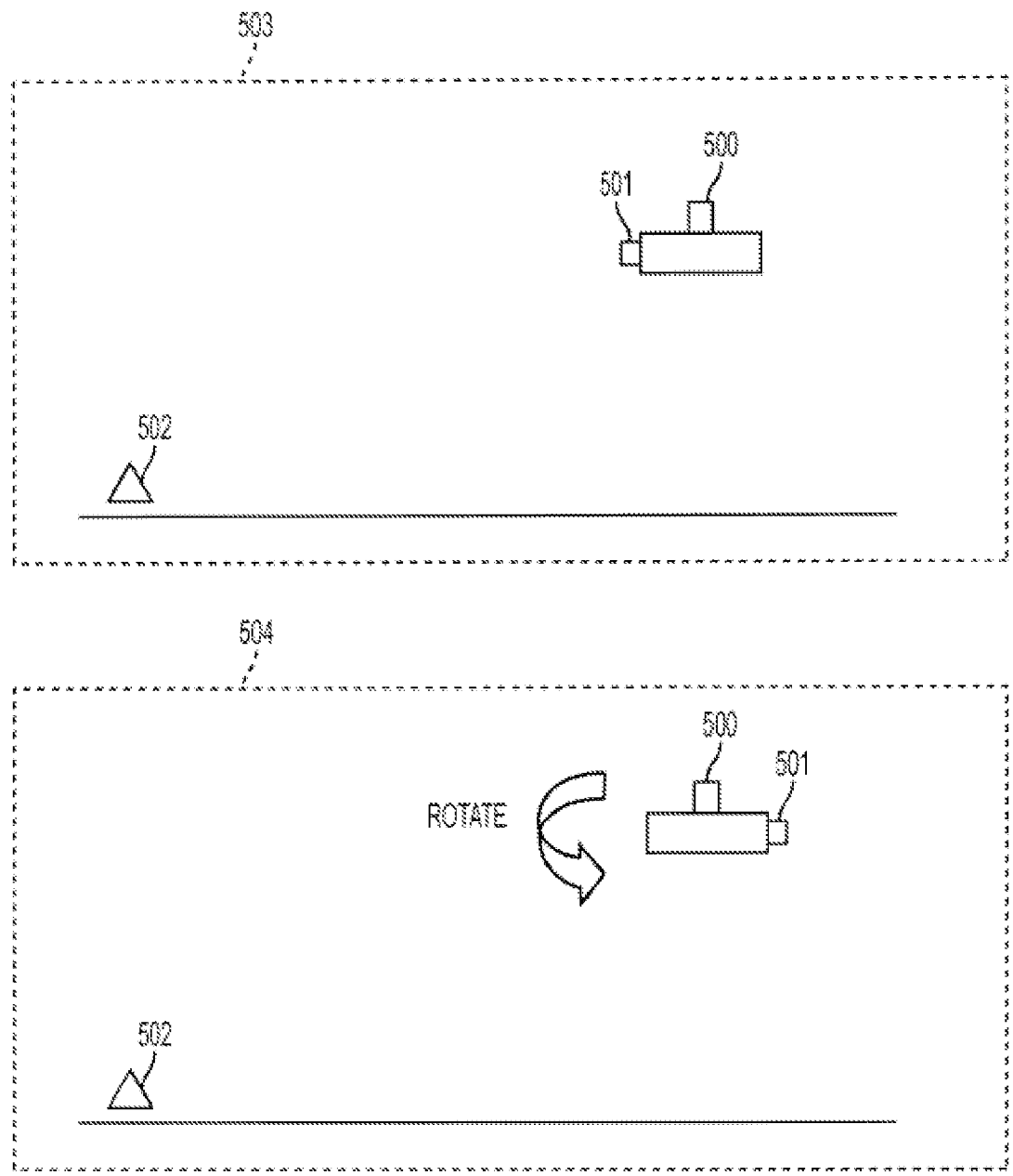
FIG. 5 shows illustrative resulting UAV flight paths determined by one embodiment of the present invention to reduce the infrared signature of the UAV relative to a point of interest.

FIG. 5 shows a flight path determined by an illustrative embodiment of the present invention to reduce the infrared signature of UAV 500 relative to a point of interest 502, which may correspond to a threat to the UAV. The undesirable flight path shown in box 503 positions the exhaust port 501 of UAV 500 in a direction facing point of interest 502. In a military context, point of interest 502 may be equipped with night vision equipment or similar sensory equipment capable of detecting infrared energy, such as the heat emitted from exhaust port 501 of UAV 500. A better flight path shown in box 504 positions the exhaust port 501 of UAV 500 in a direction facing away from point of interest 502 by rotating UAV 500 so that the main body of UAV 500 prevents exhaust port 501 from being observable by point of interest 502. To determine the better flight path in box 504, referring back to FIG. 1, the GIS Processor 103 might rely on its flight requirements and information contained in Threat Database 104. GIS Processor 103 might also rely on information about the current weather conditions obtained from Weather Database 109.

Figure 6:
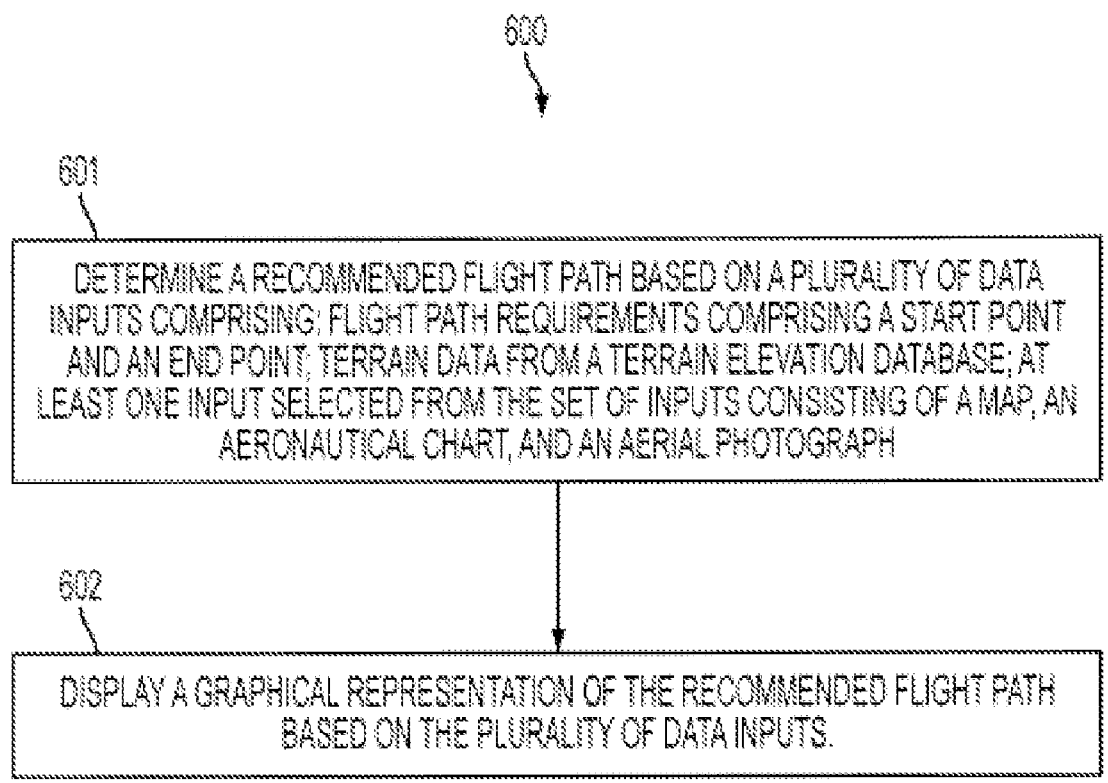
FIG. 6 depicts one illustrative embodiment of the present invention, showing a series of steps performed to determine the flight path of a UAV.

FIG. 6 is a flow diagram depicting an illustrative method 600 for determining a flight path of a UAV comprising the steps of: (1) determining a recommended flight path based on a plurality of data inputs comprising flight path requirements including a start point and an end point, terrain data from a terrain elevation database, and at least one input selected from the set of inputs consisting of a map, an aeronautical chart, and an aerial photograph 601; and (2) displaying a graphical representation of the recommended flight path based on the plurality of data inputs 602.

In a preferred embodiment, the flight path requirements of step 601 comprise a start point, an end point, and at least one point of interest. In one embodiment, the flight path requirements of step 601 may be entered by a UAV operator. In an alternative embodiment, the flight path requirements of step 601 may be received and/or downloaded directly from a source, such as from a mission command center, with or without assistance from the UAV operator.

In one embodiment, the at least one point of interest may be a location that the UAV should arrive at during the flight path or avoid during flight. The at least one point of interest may include one or more threats, which may correspond to any actual or suspected threat to the UAV's safety, including any people, sensors, or other devices designed to visually or audibly detect the UAV, detect the infrared signature of the UAV, disable the UAV, or destroy the UAV. In another embodiment, points of interest corresponding to threats are contained in a threat database.

In one embodiment, the plurality of data inputs of step 601 may further include one or more additional databases such as: (1) a threat database; (2) a map database; (3) an acoustic signature database; (4) a flora database; (5) a weather database; (6) an aerial photographic information database; and (7) an aeronautical chart database.

In a preferred embodiment, step 601 further comprises the steps of: (1) determining a flight path based on the proximity of the UAV to a point of interest; (2) determining a flight path based on the visual signature of the UAV relative to a point of interest; (3) determining a flight path based on the acoustic signature of the UAV relative to a point of interest; and/or (4) determining a flight path based on the infrared signature of the UAV relative to a point of interest. In an alternative embodiment, step 601 comprises any subset of the steps of: (1) determining a flight path based on the proximity of the UAV to a point of interest; (2) determining a flight path based on the visual signature of the UAV relative to a point of interest; (3) determining a flight path based on the acoustic signature of the UAV relative to a point of interest; and/or (4) determining a flight path based on the infrared signature of the UAV relative to a point of interest.

In one embodiment, the flight path determined and displayed by method 600 corresponds to a planned flight path, i.e., a flight path to be taken in the future. In an alternative embodiment, the flight path determined and displayed by method 600 corresponds to a real-time flight path, i.e., the actual flight path being executed in real-time by the UAV on its mission. In yet another embodiment, the flight path determined and displayed by method 600 may correspond to a planned flight path and a real-time flight path, with an operator monitoring the progress of the UAV along the planned flight path and making adjustments to the planned flight path in real-time.

Figure 7:
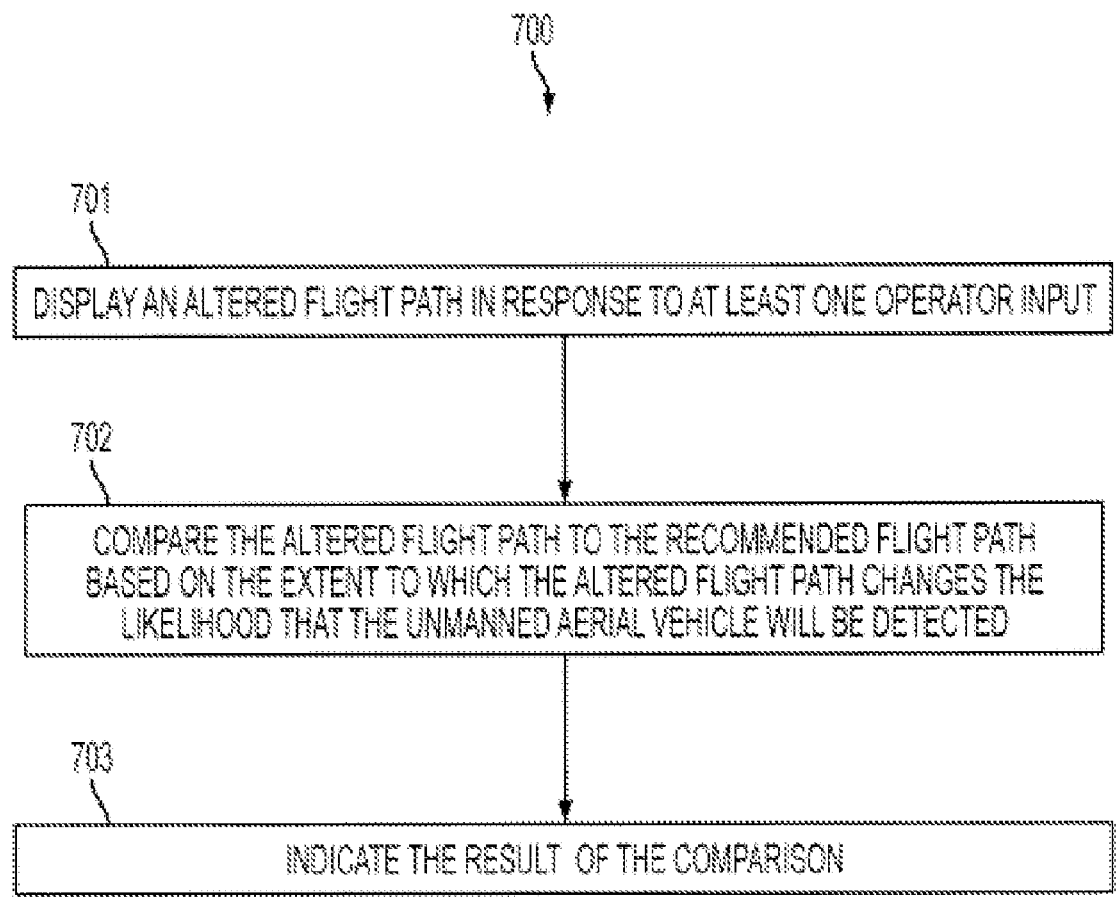
FIG. 7 depicts another illustrative embodiment of the present invention, showing a series of steps performed to compare an altered flight path to a recommended flight path and indicate the results of the comparison.

FIG. 7 is a flow diagram depicting an illustrative method 700 for determining a flight path of a UAV comprising the steps of: (1) displaying an altered flight path in response to at least one operator input 701; (2) comparing the altered flight path to the recommended flight path based on the extent to which the altered flight path changes the likelihood that the UAV will be detected 702; and (3) indicating the result of the comparison 703.

In one embodiment, indicating the result of the comparison 703 may include providing a score for the altered flight path. In one alternative embodiment, the score may be updated as flight path changes are made. In another alternative embodiment, the score of the altered flight path may be normalized relative to the recommended flight path to indicate how the altered flight path compares to the recommended flight path.

In a preferred embodiment of method 700, the likelihood that the UAV will be detected relates to: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest. In an alternative embodiment, the likelihood that the UAV will be detected relates to any subset of: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest.

Figure 8:
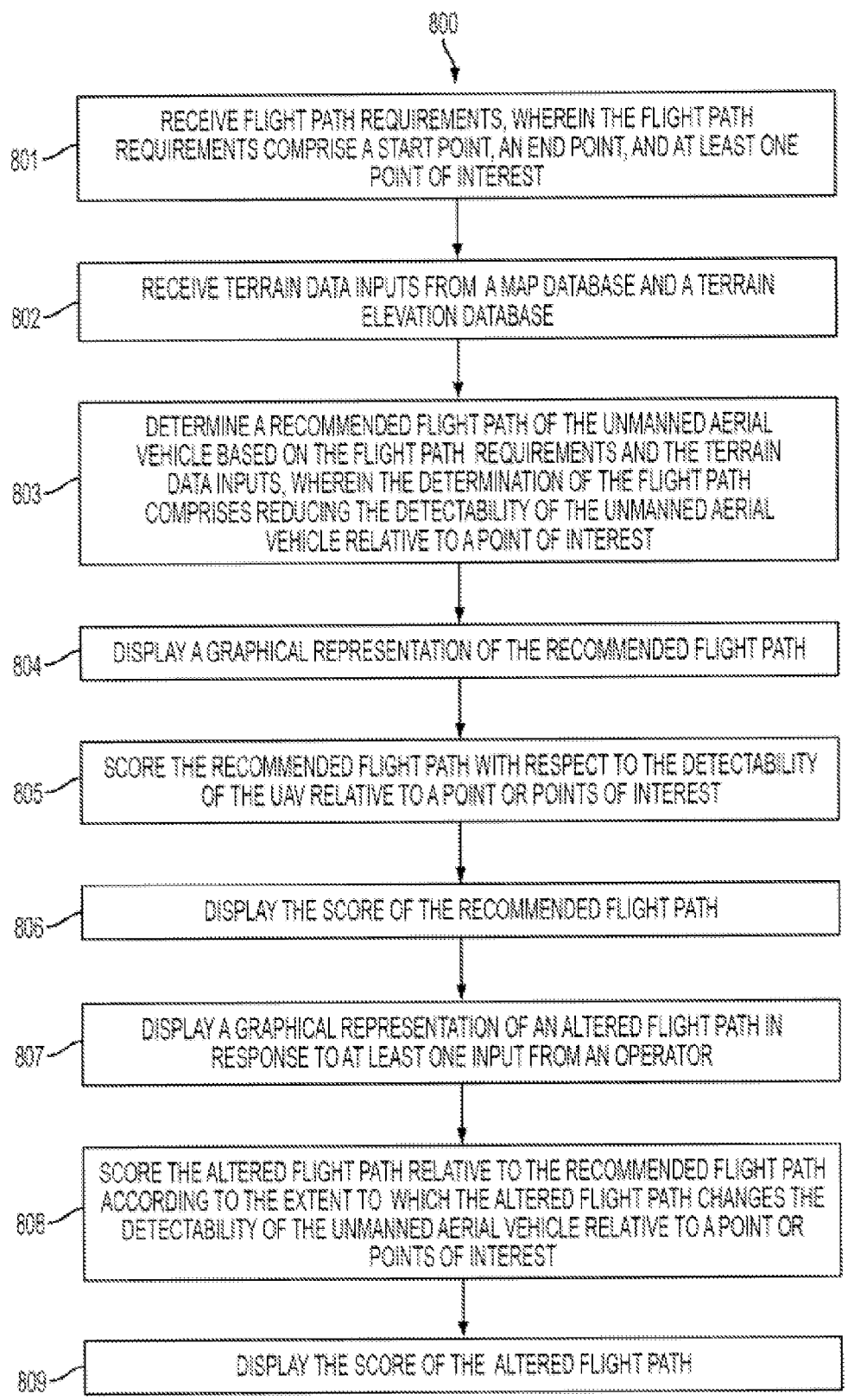
FIG. 8 depicts yet another illustrative embodiment of the present invention, showing a series of steps performed to determine the flight path of a UAV, display a recommended flight path, score the detectability of the recommended flight path, display the score, display an altered flight path, score the altered flight path relative to the recommended flight path, and display the score of the altered flight path.

FIG. 8 depicts an illustrative embodiment of the present invention, showing method 800 comprising: (1) receiving flight path requirements, wherein the flight path requirements comprise a start point, an end point, and at least one point of interest 801; (2) receiving terrain data inputs from a map database and a terrain elevation database 802; (3) determining a recommended flight path of the UAV based on the flight path requirements and the terrain data inputs, wherein the determination of the flight path comprises reducing the detectability of the UAV relative to a point of interest 803; (4) displaying a graphical representation of the recommended flight path 804; (5) scoring the recommended flight path with respect to the detectability of the UAV relative to a point or points of interest 805; (6) displaying the score of the recommended flight path 806; (7) displaying a graphical representation of an altered flight path in response to at least one input from an operator 807; (6) scoring the altered flight path relative to the recommended flight path according to the extent to which the altered flight path changes the detectability of the UAV relative to a point or points of interest 808; and (7) displaying the score 809.

In one embodiment, reducing the detectability of the UAV relative to a point of interest shown in step 803 further comprises: (1) determining a flight path based on the proximity of the UAV to a point of interest; (2) determining a flight path based on the visual signature of the UAV relative to a point of interest; (3) determining a flight path based on the acoustic signature of the UAV relative to a point of interest; and/or (4) determining a flight path based on the infrared signature of the UAV relative to a point of interest. In an alternative embodiment, reducing the detectability of the UAV relative to a point of interest shown in step 803 further comprises any subset of: (1) determining a flight path based on the proximity of the UAV to a point of interest; (2) determining a flight path based on the visual signature of the UAV relative to a point of interest; (3) determining a flight path based on the acoustic signature of the UAV relative to a point of interest; and/or (4) determining a flight path based on the infrared signature of the UAV relative to a point of interest.

In a preferred embodiment, scoring the detectability of the UAV relative to a point or points of interest as shown in step 805 relates to: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest. In an alternative embodiment, scoring the detectability of the UAV relative to a point or points of interest as shown in step 805 relates to any subset of: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest.

In a preferred embodiment, the extent to which the altered flight path changes the detectability of the UAV relative to a point or points of interest as shown in step 808 relates to: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest. In an alternative embodiment, the extent to which the altered flight path changes the detectability of the UAV relative to a point of interest as shown in step 806 relates to any subset of: (1) the proximity of the UAV to a point of interest; (2) the visual signature of the UAV relative to a point of interest; (3) the acoustic signature of the UAV relative to a point of interest; and/or (4) the infrared signature of the UAV relative to a point of interest.

We claim:

1. A method of planning a flight path of an unmanned aerial vehicle comprising in combination:
   determining a recommended flight path based on a plurality of data inputs comprising:
      flight path requirements comprising a start point and an end point;
      terrain data from a terrain elevation database;
      at least one input selected from the set of inputs consisting of a map, an aeronautical chart, and an aerial photograph; and
   displaying a graphical representation of the recommended flight path based on the plurality of data inputs.

2. The method of claim 1 wherein the plurality of data inputs further comprises at least one input from at least one database selected from the group of databases consisting of: a threat database, a map database, an acoustic signature database, a flora database, a weather database, an aerial photographic information database, and an aeronautical chart database.

3. The method of claim 1 wherein the flight path requirements further comprise at least one point of interest.

4. The method of claim 1 wherein determining a recommended flight path based on a plurality of data inputs further comprises determining a flight path based on the proximity of the unmanned aerial vehicle to a point of interest.

5. The method of claim 1 wherein determining a recommended flight path based on a plurality of data inputs further comprises determining a flight path based on the visual signature of the unmanned aerial vehicle relative to a point of interest.

6. The method of claim 1 wherein determining a recommended flight path based on a plurality of data inputs further comprises determining a flight path based on the acoustic signature of the unmanned aerial vehicle relative to a point of interest.

7. The method of claim 1 wherein determining a recommended flight path based on a plurality of data inputs further comprises determining a flight path based on the infrared signature of the unmanned aerial vehicle relative to a point of interest.

8. The method of claim 1 wherein the recommended flight path corresponds to a flight path to be taken by an unmanned aerial vehicle in the future.

9. The method of claim 1 wherein the recommended flight path corresponds to a flight path taken by an unmanned aerial vehicle in real-time.

10. The method of claim 1 further comprising:
    displaying an altered flight path in response to at least one operator input;
    comparing the altered flight path to the recommended flight path based on the extent to which the altered flight path changes the likelihood that the unmanned aerial vehicle will be detected; and
    indicating the result of the comparison.

11. The method of claim 10 wherein the likelihood that the unmanned aerial vehicle will be detected relates to the proximity of the unmanned aerial vehicle to a point of interest.

12. The method of claim 10 wherein the likelihood that the unmanned aerial vehicle will be detected relates to the visual signature of the unmanned aerial vehicle relative to a point of interest.

13. The method of claim 10 wherein the likelihood that the unmanned aerial vehicle will be detected relates to the acoustic signature of the unmanned aerial vehicle relative to a point of interest.

14. The method of claim 10 wherein the likelihood that the unmanned aerial vehicle will be detected relates to the infrared signature of the unmanned aerial vehicle relative to a point of interest.

15. A system for planning a flight path of an unmanned aerial vehicle comprising in combination:
   a means for determining a recommended flight path based on a plurality of data inputs comprising:
      flight path requirements, wherein the flight path requirements comprise a start point, an end point, and at least one point of interest;
      terrain data from a terrain elevation database;
      at least one input selected from the set of inputs consisting of a map, an aeronautical chart, and an aerial photograph; and
   a means for outputting to a display, a graphical representation of the recommended flight path based on the plurality of data inputs.

16. The system of claim 15 wherein the plurality of data inputs further comprises at least one input from at least one database selected from the group of databases consisting of: a threat database, a map database, an acoustic signature database, a flora database, a weather database, an aerial photographic information database, and an aeronautical chart database.

17. The system of claim 15 wherein the means for determining a recommended flight path based on a plurality of data inputs further comprises a means for determining a flight path based on at least one factor selected from the group of factors consisting of:
   the proximity of the unmanned aerial vehicle to a point of interest;
   the visual signature of the unmanned aerial vehicle relative to a point of interest;
   the acoustic signature of the unmanned aerial vehicle relative to a point of interest; and
   the infrared signature of the unmanned aerial vehicle relative to a point of interest.

18. The system of claim 15 further comprising:
   means for displaying an altered flight path in response to at least one operator input;
   means for scoring the altered flight path relative to the recommended flight path according to the extent to which the altered flight path changes the likelihood that the unmanned aerial vehicle will be detected; and
   means for displaying the score of the altered flight path.

19. The system of claim 15 wherein the likelihood that the unmanned aerial vehicle will be detected relates to one factor selected from the group of factors consisting of:
   the proximity of the unmanned aerial vehicle to a point of interest;
   the visual signature of the unmanned aerial vehicle relative to a point of interest;
   the acoustic signature of the unmanned aerial vehicle relative to a point of interest; and
   the infrared signature of the unmanned aerial vehicle relative to a point of interest.

20. A method of planning a flight path of an unmanned aerial vehicle comprising:
   receiving flight path requirements, wherein the flight path requirements comprise a start point, an end point, and at least one point of interest;
   receiving terrain data inputs from a map database and a terrain elevation database;
   determining a recommended flight path of the unmanned aerial vehicle based on the flight path requirements and the terrain data inputs, wherein the determination of the flight path comprises reducing the detectability of the unmanned aerial vehicle relative to a point of interest;
   displaying a graphical representation of the recommended flight path;
   displaying a graphical representation of an altered flight path in response to at least one input from an operator;
   scoring the altered flight path relative to the recommended flight path according to the extent to which the altered flight path changes the detectability of the unmanned aerial vehicle relative to a point of interest; and
   displaying the score.

* * * * *